May 8, 1962    W. C. MILLER ETAL    3,033,072
VARIABLE MASK FOR TELESCOPIC FINDER
Filed March 7, 1961
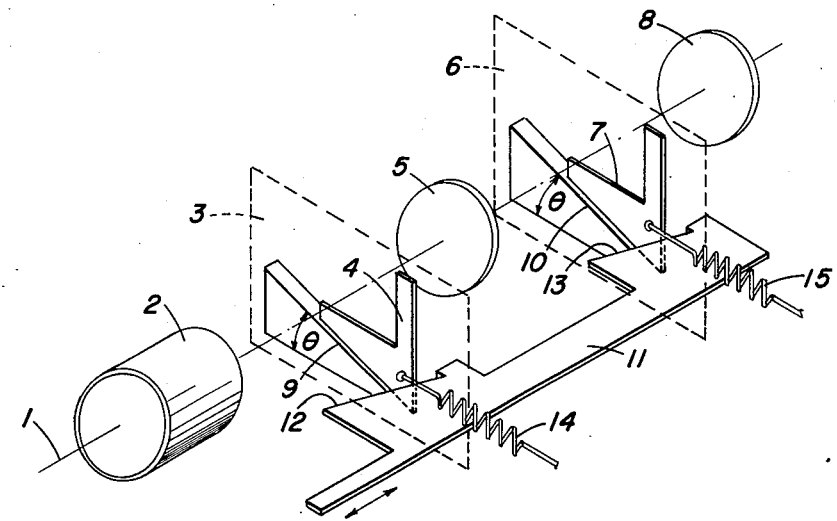
WALTER C. MILLER
HENRY O. SCHMITT JR.
INVENTORS
BY
ATTORNEYS

United States Patent Office 3,033,072
Patented May 8, 1962

3,033,072
VARIABLE MASK FOR TELESCOPIC FINDER
Walter C. Miller and Henry O. Schmitt, Jr., Rochester, N.Y., assignors to Eastman Kodak Company, Rochester, N.Y., a corporation of New Jersey
Filed Mar. 7, 1961, Ser. No. 94,030
3 Claims. (Cl. 88—1.5)

This invention relates to viewfinders, and more particularly to viewfinders in which the angular field viewed is adjustable.

Viewfinders having some provision for changing the angular field of view are widely used; for example, many still cameras having interchangeable objectives of various focal lengths are provided with one adjustable viewfinder which can show the field of view of all the objectives rather than numerous fixed viewfinders each covering the field of only one objective. In the case of movie cameras provided with objectives of continuously variable focal length ("zoom" lenses) it is almost a necessity to have a continuously variable viewfinder of some kind, and preferably one that can be coupled to the zoom lens so that the field shown in the viewfinder is the same as that covered by the zoom lens at all times.

Viewfinders that are continuously adjustable and that can be coupled to a zoom lens are known, as are adjustable viewfinders that couple automatically to fixed focus lenses designed to be used with them. Some of such viewfinders are "zoom" viewfinders, i.e. include variable power optics. Others have variable masks located in the plane of a real image in the viewfinder system. Variable masks which simultaneously adjust all four sides of the frame independently involve complicated structures examples of which are given below, and it is an object of the present invention to avoid such complications while still providing precision adjustment.

Prior variable mask viewfinders have either two L-shaped mask sections or four independent mask sections, all located in approximately the same plane. The parts of the mask must move in different directions to keep the viewed field centered as it becomes smaller.

One difficulty of the usual variable mask system as described above is that the masks and the mechanism needed to move them are of finite thickness, and consequently not all of the mask edges can be exactly in the plane of a real image and some edges will not appear in sharp outline to the viewer. To get the mask edges as nearly as possible into such a plane, parts must be made as thin as possible, and the designer is therefore limited in what he can do to make the mechanism simple and rugged.

Another difficulty is that if two L-shaped masks are used, they must move in diametrically opposed directions in order to keep the correct height-width ratio of the viewed field and at the same time to keep it centered. Similarly, a mask using four separately moving masking edges must move two edges vertically in opposed directions and the other two edges horizontally in opposed directions and at the same time the vertical and horizontal movements must be coupled together to keep the height-width ratio constant. Such motions require complicated linkages or dual spiral-grooved cams or the like and it is difficult for the designer to make them small, simple, rugged and inexpensive.

Our invention overcomes these difficulties in that it allows all mask edges to be placed in the plane of a real image, and the mask motions required are in one direction only, so that the operating mechanism may be made small, simple, rugged and inexpensive.

One object of our invention, then, is to provide a variable viewfinder in which the mask edges are all in the plane of a real image. Another object is to provide a variable viewfinder in which the mechanical motions required are simple. Still another object is to provide a variable viewfinder in which the operating mechanism is small, simple, rugged and inexpensive to manufacture.

The way in which these and other objects are achieved will become apparent from an explanation of a preferred embodiment of the invention and from the drawing which shows:

A perspective view of a preferred embodiment of the invention.

In the drawing, lens 2 on the optical axis 1 is the objective of the viewfinder, and is a positive lens which forms a real image of the scene viewed in the plane 3. A half-field mask 4, whose masking edges are L-shaped, is located in plane 3. An erector lens 5 is placed on the optical axis and is a positive lens which serves to form a real image in plane 6 of the real image in plane 3. A half-field mask 7, whose masking edges are also L-shaped, is in the plane 6 of the relayed image. An eye-piece 8 located on the optical axis permits visual inspection of the relayed image in plane 6 at close range. The eyepiece is not necessary to the invention; the relayed image could be viewed directly, but the normal eye cannot accommodate for viewing distances less than about 10 inches, and hence without the eyepiece the eye would have to be at least 10 inches behind plane 6, which would make the image appear quite small and also make the system inconveniently long.

The erector lens 5 forms a real inverted image in plane 6 of anything in plane 3. The original image in plane 3 is inverted relative to the subject, and hence the relayed image in plane 6 is right side up and correctly oriented laterally relative to the subject. At the same time, the erector lens forms an inverted image of the L-shaped mask edges of mask 4, and therefore the mask edges will appear to limit the top and left-hand sides of the image in plane 6. The L-shaped mask edge of mask 7 limits the bottom and right-hand side of the image in plane 6, and the viewer sees an image field completely surrounded by a rectangular mask.

The half-field masks 4 and 7 rest on inclined planes 9 and 10, each making an angle $\theta$ with the horizontal. The size of field visible in the viewfinder is varied by moving both masks in the same direction along the inclined planes. Because the motion of mask 4 is inverted by the erector lens, the two masks will appear to move together or apart symmetrically, keeping the visible field centered on the optical axis. The angle $\theta$ is determined by the desired format of the picture; it is the angle made by a picture diagonal with the horizontal, and is given by $$\theta = \tan^{-1}\frac{y}{x}$$

where $y/x$ is the ratio of height to width of the picture.

Because the erector lens forms a real image in plane 6 of an object in plane 3, the two planes are said to be conjugate with respect to the erector lens. There is an infinite number of pairs of conjugate planes 3 and 6 for the erector lens, but there is only one pair for which the object and image are the same size, i.e. for which the erector lens works at unity magnification. For all other conjugate planes the image size is either enlarged or reduced from the object size. The same thing is true of motions in conjugate planes; at unity magnification a movement of mask 4 of magntiude $d_1$ along the inclined plane will appear as a movement of magnitude $d_1$ in the opposite direction in the image plane 6, while with any other magnification the magnitude of $d_1$ will be changed in the same proportion as are linear dimensions, with the direction of motion still directly opposite to that of mask 4.

Any suitable means may be used to move the masks 4 and 7, but a preferred method which is quite simple is shown. The cam 11 has cam surfaces 12 and 13 engaged respectively with the masks 4 and 7. The masks may be resiliently urged against the cam surfaces by the springs 14 and 15, or any other suitable means. A motion of the cam 11 in a direction parallel to the optical axis causes the masks to move transversely to the optical axis in the same direction. If the erector lens is working at unity magnification then the masks must move by the same amount in their respective planes to keep the visible field centered, and cam surfaces 12 and 13 have the same slope. If some other magnification is used, then the ratio of movement of mask 4 to that of mask 7 must be inversely proportional to the magnification, and therefore the ratio of the slope of cam surface 12 to the slope of cam surface 13 must also be inversely proportional to the magnification.

The invention has been described in detail with particular reference to preferred ebodiments thereof, but it will be understood that variations and modifications can be effected within the spirit and scope of the invention as described hereinabove and as defined in the appended claims.

We claim:
1. An adjustable viewfinder comprising an objective for forming a first image of the subject to be viewed, an erector lens in optical alignment therewith for relaying said image to a second image plane, a pair of half-field masks located respectively in the planes of said first and second images, and means for moving said masks simultaneously in their respective planes by equivalent amounts and in the same direction to adjust the size of the field visible through the viewfinder.

2. A viewfinder as in claim 1, in which the means for moving the masks is a single longitudinally moving cam having two cam surfaces engaged respectively one with each mask.

3. A viewfinder as in claim 1, in which the erector lens works at unity magnification and the masks are moved the same amount.

No references cited.